AUTOMATIC RECOGNITION OF HANDWRITING

Filed June 14, 1960 7 Sheets-Sheet 1

INVENTOR
L. S. FRISHKOPF
BY A. E. Hirsch, Jr.
ATTORNEY

AUTOMATIC RECOGNITION OF HANDWRITING

Filed June 14, 1960 7 Sheets-Sheet 2

INVENTOR
L. S. FRISHKOPF
BY
A. E. Hirsch Jr.
ATTORNEY

May 12, 1964 — L. S. FRISHKOPF — 3,133,266

AUTOMATIC RECOGNITION OF HANDWRITING

Filed June 14, 1960 — 7 Sheets-Sheet 3

INVENTOR
L. S. FRISHKOPF
BY [signature]
ATTORNEY

May 12, 1964 L. S. FRISHKOPF 3,133,266

AUTOMATIC RECOGNITION OF HANDWRITING

Filed June 14, 1960 7 Sheets-Sheet 4

INVENTOR
L. S. FRISHKOPF
BY
A. E. Hirsch Jr.
ATTORNEY

| EXTREMAL NO. | BIT A | BIT B | BIT C | BIT D | BIT E |
|---|---|---|---|---|---|
| 1 | 1 | 0 | 1 | 0 | 1 |
| 2 | 0 | 1 | 0 | 1 | 1 |
| 3 | 1 | 1 | 1 | 1 | 1 |
| 4 | 1 | 0 | 1 | 0 | 1 |
| 5 | 1 | 1 | 1 | 0 | 0 |
| 6 | 0 | 1 | 0 | 1 | 1 |
| 7 | 0 | 0 | 0 | 1 | 0 |
| 8 | 1 | 0 | 1 | 0 | 1 |
| 9 | 0 | 1 | 0 | 1 | 0 |
| 10 | 1 | 1 | 1 | 0 | 1 |
| 11 | 0 | 0 | 0 | 1 | 0 |
| 12 | 1 | 0 | 1 | 0 | 1 |
| 13 | 1 | 1 | 1 | 1 | 1 |
| 14 | 0 | 0 | 0 | 1 | 0 |
| 15 | 1 | 0 | 1 | 0 | 1 |
| 16 | 1 | 1 | 1 | 0 | 1 |
| 17 | 1 | 0 | 0 | 1 | 0 |
| 18 | 0 | 0 | 0 | 1 | 1 |
| 19 | 1 | 1 | 1 | 0 | 0 |
| 20 | 0 | 1 | 0 | 1 | 1 |
| 21 | 1 | 0 | 1 | 0 | 0 |
| 22 | 1 | 1 | 1 | 0 | 0 |
| 23 | 1 | 0 | 1 | 0 | 0 |

INVENTOR
L. S. FRISHKOPF
BY A. E. Hirsch Jr.
ATTORNEY

May 12, 1964 L. S. FRISHKOPF 3,133,266
AUTOMATIC RECOGNITION OF HANDWRITING
Filed June 14, 1960 7 Sheets-Sheet 6

INVENTOR
L. S. FRISHKOPF
BY A. E. Hirsch Jr.
ATTORNEY

INVENTOR
L. S. FRISHKOPF
BY A. E. Hirsch Jr.
ATTORNEY

United States Patent Office 3,133,266

Patented May 12, 1964

3,133,266

AUTOMATIC RECOGNITION OF HANDWRITING

Lawrence S. Frishkopf, Summit, N.J., assignor to Bell Telephone Laboratories, Incorporated, New York, N.Y., a corporation of New York Filed June 14, 1960, Ser. No. 35,922
8 Claims. (Cl. 340—146.3)

This invention relates to the automatic recognition and identification of two-dimensional figures, and more particularly to a method and apparatus for automatically recognizing and classifying handwritten continuous cursive script representing, for example, words in the English language.

A principal object of the invention is the automatic translation of connected cursive script depicting patterns such as words, or the like, into a form suitable for utilization in automatic printing equipment, such as electrically operated typesetters and typewriters, or into a language capable of being utilized directly in the control of computer or data processing equipment. More specifically its object is to convert connected cursive handwriting into what may be termed "machine language," i.e., to transfer written intelligence to machines or to other human beings.

It is often required that continuous handwritten script, such as a plurality of alphabetical letters written together as full words, be automatically identified. Unfortunately, machine recognition devices ordinarily respond only to single hand or machine printed characters that are distinctly separated from one another, and not to entire words handwritten with connected script characters. Thus, character or pattern recognition in the past has generally been restricted to the inspection of well separated, simple line drawings of the sort that are used in typed or carefully hand printed characters.

The present invention is predicated on the realization that the recognition of handwriting largely depends upon one or more levels of context. Because of the enormous variability of handwritten script, individual letters are not unambiguously recognizable when removed from their word surroundings; even recognition of words often depends on cues from a larger context. Individual letters, a sequence of letters, words and grammatical sequences of words form increasing levels of contextual complexity. It is thus desirable to select a level of complexity upon which to base recognition that both includes sufficient context to permit unambiguous recognition and minimizes the storage requirements of the system. Evidently these are complementary considerations; a gain in one is accompanied by a loss in the other.

It has been found that a satisfactory compromise between these two considerations is obtained by using entire words as the basic unit for recognition. This choice has a number of advantages; most importantly, words rather than letters form the natural units of handwriting. Since words are the smallest informational units of language, writers normally attempt to preserve features of a word that permit recognition. To the contrary, the average writer makes little effort to preserve individual letter identity. Actually, there is little to be gained by preserving letter features except insofar as they contribute to the preservation of word formation. If word context is sufficiently strong the writer often resorts to some word ambiguity. However, a word formation of script usually contains a sufficient number of recognizable features to permit unambiguous recognition. In addition, segmentation of handwriting into words is naturally accomplished in the writing process, whereas letter segmentation is not.

Just as letter recognition requires a stored alphabet of letter features so also word recognition requires a stored dictionary of word representations. The size and the nature of the dictionary is, in large measure, responsible for the ultimate performance of such a system. If the dictionary is restricted to a few selected words, discrimination among these words may be accomplished with relatively little difficulty. However, the representation of a word in a fashion that permits discrimination among a large unrestricted vocabulary is a far more difficult problem and requires a more sophisticated analysis.

It is a particular object of the present invention to translate electrical signals representative of full words, handwritten with connected cursive script, on a word-by-word basis into a suitable manifestation of word identity.

The present invention turns these various considerations to account in analyzing entire words by eliminating highly variable, non-informational details that burden the storage requirements of a dictionary. It has been found that an appropriate and economical representation of handwriting that meets the aforementioned requirements is obtained from a consideration of an ordered listing of extremals of the letters that together form a word, e.g., a word in the English language. An extremal is defined as a point in a script trace at which the trace passes through a local maximum or minimum in either one of two coordinate directions, e.g., X or Y. For convenience, the X coordinate is taken to represent the general direction of writing. Additionally, the character of the interval between successive extremals provides useful information leading to recognition.

An important feature of the invention is the means by which a handwritten word of cursive script letters is analyzed for identification regardless of its relative size or exact position on a writing surface. The absence of physical constraints on the size of handwriting and the lack of restriction on the exact shape or position of writing is an important consideration in automatic recognition apparatus. It avoids both the machine centering problem and, for the most part, the psychological deterrents imposed on an operator by restrictive guide lines, guide marks, and prescribed letter style and size.

It is another object of the present invention to analyze handwritten cursive script written substantially without restriction as to the size, position of the script formation, or exact shape of individual letters to obtain sufficient data for identifying the formation.

The invention in one of its principal forms is realized by generating real time signals $X(t)$ and $Y(t)$ proportional to the coordinates of position of a writing instrument as it is moved over the writing surface of a transducer, such as a telewriter or the like, to produce script formations representing full words. The continuous coordinate signal information from the telewriter is analyzed to detect both X and Y extremals, and indicia of the extremals is normalized to a standard reference level, and recorded in binary form in a suitable storage medium. Advantageously, information characteristic of the relative orientation of successive extremals, such as the sign of the slope of a line joining them, is detected and recorded. A correlation comparison of the ordered extremal listing, in binary symbol form, of the words to be identified with an ordered extremal listing of each of the plurality of dictionary words is performed and the highest correlation figure is employed to produce a manifestation of word identity.

The invention will be fully comprehended from the following detailed description of illustrative embodiments thereof taken in connection with the appended drawings, in which.

Figure 1:
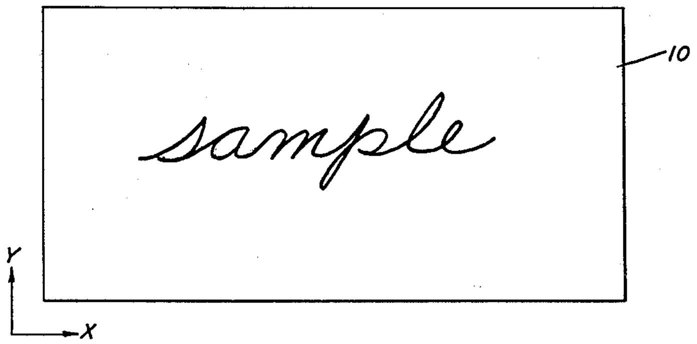
FIG. 1 is a pictorial representation of a typical sample word handwritten in connected cursive script.

In the interests of simplicity the circuit diagrams to be discussed are presented, for the most part, in block schematic form with single line paths to direct the flow of information to the several apparatus components which process it. This rule is departed from in a few individual instances where the inclusion of electric input terminals and output terminals appears to add to the clarity of the exposition. It is to be understood that, in practice, each single line information path will normally be realized with two electric conductors, one of which may, in many cases, be connected to ground.

Referring now to the drawings,

FIG. 1 shows a typical sample word handwritten with connected cursive script on an unlined surface 10. For convenience, the coordinate directions X and Y are established with X denoting the general direction of writing.

Figure 2:
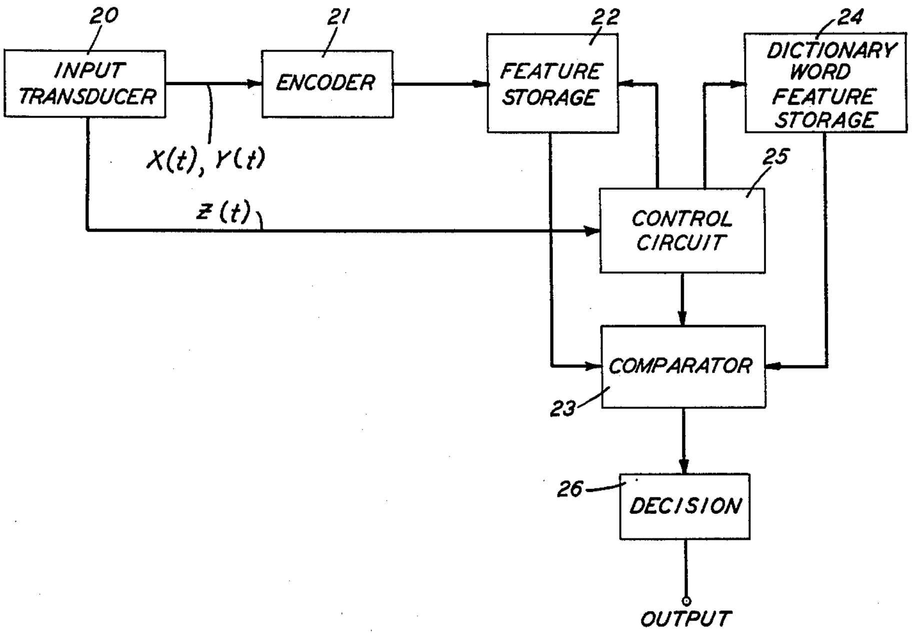
FIG. 2 is a functional block diagram illustrating the general organization and arrangement of the various elements of the invention.

FIG. 2 illustrates by way of introduction a functional block diagram of the general organization and arrangement of the various elements that together comprise the present invention. Handwritten cursive script produced by a writer is translated in input transducer 20 into a plurality of electrical signals. The electrical signals specify in real time the position of a writing instrument on the transducer writing surface as it progresses from left to right. Typically, input transducer 20 may comprise a telewriter instrument, or the like, under the control of a human operator. It converts the continuous coordinate line trace information into varying voltages $E_X(t)$ and $E_Y(t)$ that are proportional to the position of the telewriter stylus at every instant. In addition, a voltage $E_Z(t)$ is produced to indicate the stylus up-down position, i.e., a pulse is produced when the operator lifts the stylus at the end of a word. Telewriter apparatus suitable for use in the invention is described in F. K. Becker Patent 2,925,467, granted February 16, 1960.

The varying voltages $E_X(t)$ and $E_Y(t)$ derived from the input transducer 20 are supplied to an encoder 21 and the varying signal $E_Z(t)$ is supplied to control apparatus 25. Encoder 21 operates separately on $E_X(t)$ and $E_Y(t)$ to detect extremals, i.e., the points in time at which either $E_X(t)$ or $E_Y(t)$ pass through a local maximum or a minimum, and also to determine the sign of the slope of a straight line joining successive extremals. In addition, encoder 21 classifies the extremals in the Y coordinate direction into one of a small number of representative levels, e.g., it quantizes the Y extremal information into three levels.

Since the writing field of the telewriter, i.e., the field 10 of FIG. 1, is an unlined area with no restriction placed upon the size, shape or direction of writing other than the requirement that it be Roman cursive script written essentially in the X direction, encoder 21 normalizes the extent of the extremals in the Y coordinate direction such that all words are reduced or expanded in size about a mean level so that classification of extremal information and subsequent identification is achieved essentially independently of the manner of writing.

Binary information characterizing the detected externmal information is recorded in feature storage apparatus 22 and, upon an appropriate command signal from control apparatus 25, is transferred to one input of comparator apparatus 23 wherein the features for an entire word are compared with a similar set of features characteristic of each one of an ensemble of selected dictionary words. Dictionary word feature storage apparatus 24 stores permanently characteristic features of dictionary words and, in response to the command signal, supplies them sequentially to the comparator 23, there to be correlated with word features from storage apparatus 22. A signal proportional to the cross-correlation of the two is supplied to decision circuit appartus 26. Typically, the command signal for initiating the comparison operation is supplied by the voltage $E_Z(t)$ from input transducer 20 by way of control apparatus 25. The highest correlation between word features derived from the encoder 21 (and registered in storage apparatus 22) and features stored in dictionary storage apparatus 24 is detected in decision circuit apparatus 26 and a suitable signal is supplied to an output circuit.

Figure 3:
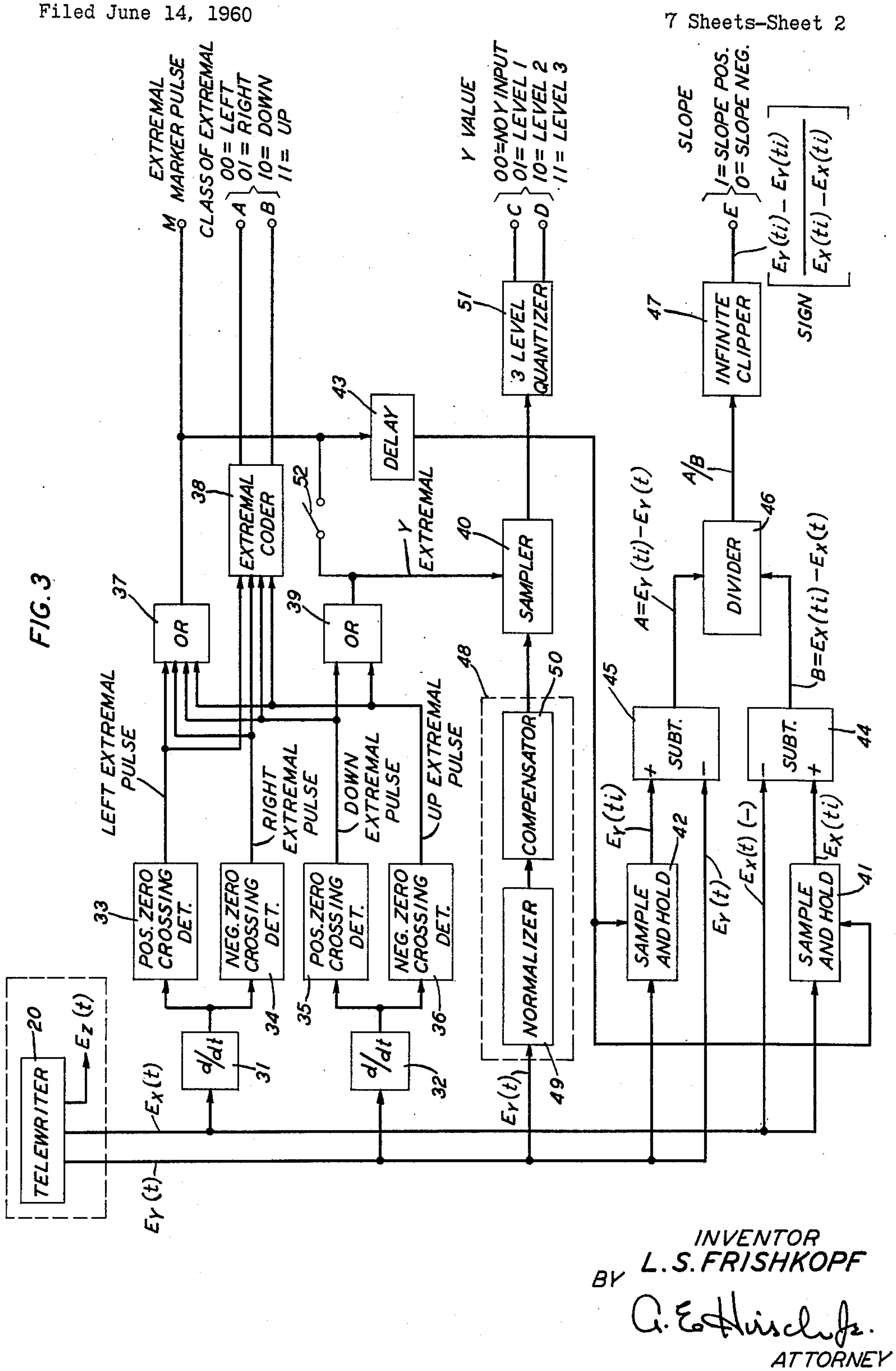
FIG. 3 is a block schematic diagram showing in detail the elements of the encoder apparatus of FIG. 2.

Details of the encoder apparatus 21 are shown in FIG. 3. Coordinate signal information $E_Y(t)$ and $E_X(t)$ supplied from telewriter 20 are supplied in parallel to a number of individual circuits arranged to extract sufficient information to characterize an entire handwritten word in terms of (1) X and Y extremals, (2) the magnitude of Y extremals, and (3) the sign of the slope of a straight line joining successive extremals. This information in binary form is supplied at output terminals A, B, C, D, and E. In addition, the presence of an extremal marker pulse is supplied at terminal M.

The presence and nature of signal extremals may be detected in a number of ways. Since the peak of a wave occurs at the same instants as do the zero or null values of its first derivative, suitable marker pulses may be obtained by differentiating the varying voltages and examining the derivatives for zero values. Apparatus suitable for performing this function may be of any desired type; e.g., that described in an application of M. V. Mathews, Serial No. 684,993, filed September 19, 1957, now Patent 3,023,277, granted February 27, 1962. Accordingly, voltage $E_X(t)$ is differentiated in differentiator apparatus 31, and voltage $E_Y(t)$ is differentiated in differentiator apparatus 32. The outputs of the differentiators, $$\frac{dX}{dt}$$

and $$\frac{dY}{dt}$$

are supplied respectively to the input terminals of zero axis crossing detectors 33 and 34, and 35 and 36. The positive zero crossing detectors 33 and 35 produce a pulse output when the input signal passes through zero in a positive-going direction. Similarly, the negative zero crossing detectors 34 and 36 produce a pulse output when the input signal passes through zero in a negative-going direction. Accordingly, an extremal in either the X coordinate direction or the Y coordinate direction is sufficient to produce a pulse at the output of the appropriate one of the zero crossing detectors. The outputs of all of the zero crossing detectors are supplied as an input to OR gate 37 so that a detected zero crossing, denoting an extremal of any sort, produces at output terminal M a marker pulse indicative of the presence of an extremal.

In addition, the outputs of the zero crossing detectors are supplied as inputs to extremal coder apparatus 38. Extremal coder apparatus 38 transforms the pulse supplied by each of the zero crossing detectors into a 2-bit binary signal uniquely identifying the class of the extremal. Apparatus of this sort is well known. Thus, for example, a left extremal in the X coordinate direction (identified by a pulse from zero crossing detector 33) is represented by one code pulse combination whereas an up extremal (from zero crossing detector 36) receives a separate and distinct label. The output of the coder is supplied to the terminals A and B with the following output code:

$(A=0,\ B=0)$=left extremal
$(A=0,\ B=1)$=right extremal
$(A=1,\ B=0)$=down extremal
$(A=1,\ B=1)$=up extremal For convenience, the presence of a pulse may be designated a one signal and the absence of a pulse a zero signal.

Figure 4:
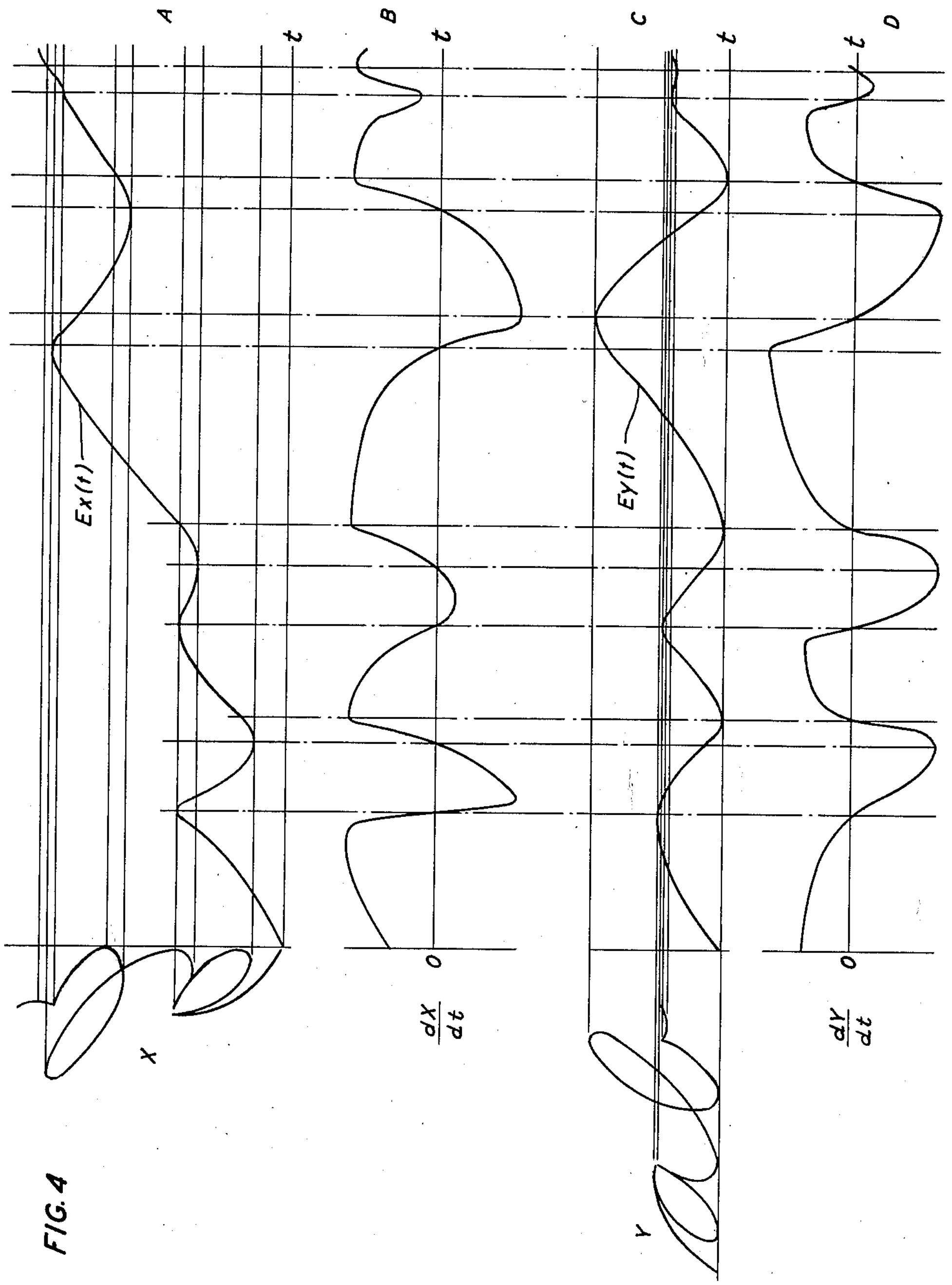
FIG. 4 is a group of wave form diagrams helpful in explaining the apparatus of FIG. 3.

The significance of the zero axis crossing information in detecting X and Y extremals is illustrated in FIG. 4. In the figure, an illustrative handwriting sample of cursive script comprising the joined letters *ab* are illustrated together with the continuous voltages $E_X(t)$, shown as a function of time in line A of the figure, and $E_Y(t)$, shown as a function of time in line C. The corresponding derivative functions are shown in lines B and D of the figure. Wherever $X(t)$ has a maximum it will be noted that $$\frac{dX}{dt}$$

has a zero passing from positive to negative value. Thus a negative-going zero crossing denotes an X extremal. Where $X(t)$ has a minimum value its derivative has a positive-going zero crossing. Similarly, a maximum extremal in Y has a negative-going zero crossing in its derivative whereas a minimum extremal in $Y(t)$ is characterized by a positive-going zero crossing in its derivative. It will thus be seen that a maximum extremal in $X(t)$ corresponds to a rightmost point in the handwriting, while a minimum extremal in $X(t)$ corresponds to a leftmost point in the handwriting. Similarly, a maximum extremal in $Y(t)$ corresponds to an uppermost point in the handwriting while a minimum extremal in $Y(t)$ identifies a lowermost point. It is assumed that in producing the script samples illustrated in FIG. 4, the writing instrument was moved at a constant speed. It will be appreciated, of course, that different operators will write with varying speeds to generate coordinate voltages of somewhat different time structure. However, the zero axis crossings retain their relative positions regardless of the speed of writing so that the information produced at the output of the encoder (order and number of extremals) is virtually the same for a great many different writing speeds and manners.

A second encoding operation of $E_X(t)$ and $E_Y(t)$ is performed to determine the sign of the slope of the line connecting successive extremals. Accordingly, $E_X(t)$ and $E_Y(t)$ from telewriter 20 are continuously supplied to sample-and-hold circuits 41 and 42, respectively. In essence, a sample-and-hold circuit takes a brief sample of an applied continuous signal, upon command, and holds the sampled value until the next command signal is received. The "held" sample value is continuously available at the output of the current, but is released by the command signal and replaced by the new sample value. Circuits that exhibit these characteristics are well known in the art. Whenever an extremal is detected in either X or Y, the corresponding sample-and-hold circuit is activated by an extremal marker pulse from output terminal M by way of delay apparatus 43. A sample of both $E_X(t)$ and $E_Y(t)$ is thus extracted and held until the occurrence of the next successive extremal. In this interval, the held value is made available at one terminal of a subtractor; e.g., subtractors 44 and 45. The output of sample-and-hold circuit 42 thus represents the Y coordinate of the last detected extremal and may be denoted as $E_Y(t_1)$. Similarly, the output of sample-and-hold circuit 41 represents X coordinate of the same extremal and may be denoted $E_X(t_1)$. On the occurrence of the next successive extremal in either X or Y, the coordinates of the new extremal are sampled and held in circuits 41 and 42. The extremal marker pulse is delayed in apparatus 43 for a period sufficient to insure that the signal previously developed at terminal E is properly stored (in the apparatus of FIG. 7 to be described hereinafter) upon occurrence of an extremal marker pulse at terminal M, before the same marker pulse is effective to cause a new pair of coordinate samples to be registered in sample-and-hold circuits 41 and 42. A delay period of approximately one millisecond is satisfactory. With this delay, sampling occurs sufficiently close to the extremal for satisfactory operation of the apparatus.

Subtractor 44 is supplied at its positive input terminal with the signal denoting the X coordinate of the last detected extremal and at its negative input terminal with the instantaneous coordinate signal $E_X(t)$. It develops a signal proportional to the difference between the two. Similarly, subtractor 45 is supplied at its positive input termal with the signal denoting the Y coordinate of the last detected extremal, and at its negative terminal with the instantaneous Y coordinate signal $E_Y(t)$. It produces a signal proportional to the difference between the two. Thus, subtractor 44 supplies as its output a signal proportional to $E_X(t_1)-E_X(t)$ and subtractor 45 supplies as its output a signal proportional to $$E_Y(t_1)-E_Y(t)$$

The difference signals are supplied to a divider 46 whose output is the quotient $$\frac{E_Y(t_1)-E_Y(t)}{E_X(t_1)-E_X(t)}$$

At the occurrence of another extremal, this quantity represents the slope of a line connecting successive extremals, either in X or Y. A large number of mechanisms and devices are available for carrying out the operation of dividing one input signal by another input signal to provide an output signal proportional to their quotient. One convenient one involves deriving a signal proportional to the logarithm of the dividend quantity and another signal proportional to the logarithm of the divisor quantity, employing for this purpose any of a variety of devices having logarithmic characteristics; then subtracting one of the logarithmic signals from the other, and, finally, converting the logarithm signal difference into its antilogarithm, employing a device having an exponential characteristic. Various ways of implementing this proposal or an alternative thereof are well known. One suitable way is shown and described, particularly in connection with FIG. 3, in W. H. Highleyman Patent 2,978,675.

The sign of the quotient is obtained conveniently by passing the signal from divider 46 through an infinite clipper 47 of any desired type. The output of the infinite clipper is a binary signal, either +1 or −1, and represents the sign of the slope of the line connecting extremal $X(t_1)$, $Y(t_1)$ with the trace point $X(t)$, $Y(t)$. It may conveniently be specified that a +1 signal denotes positive slope and a −1 signal (normalized to zero if desired) denotes a negative slope. When either X or Y passes through another extremal, the sign of the binary signal at terminal E is that of the slope of the line connecting consecutive extremals. It is immediately read into storage (by means of an extremal marker pulse from terminal M) in the apparatus of FIG. 7, to be discussed hereinafter.

A third encoding operation involves the assignment of each Y extremal, both positive and negative, to one of three specified amplitude groups, i.e., it involves the quantization of Y extremal information. Since no reference or guide lines are employed for describing cursive script in the present invention, vertical extremal decisions are based on the relative amplitudes of all Y extremals within an entire word. The decisions are based on the observation that the Y extremals, corresponding to large upper or lower extensions in a word, are few in number and so have little effect on the average Y amplitude of handwriting; however, they greatly affect the amplitude limits. The three amplitude groups are based on a three-level quantization of Y extremals wherein large lower extremals such as those that occur in g and y are classified, for example, as being members of group $G_1$, large upper extremals such as those that occur in d and l, are classified as belonging to group $G_3$, and all other Y extremals such as those that occur in e and o, as well as those that occur in g and d are classified as belonging to group $G_2$. Four types of words are found in this classification system:

(*a*) Those having only $G_2$ extremals, e.g., see;
(*b*) Those having both $G_1$ and $G_2$ extremals, e.g., pay;
(*c*) Those having both $G_2$ and $G_3$ extremals, e.g., lake; and
(*d*) Those having $G_1$, $G_2$, and $G_3$ extremals, e.g., help.

Accordingly, continuous Y information from telewriter 20 is supplied by way of normalizer-compensator apparatus 48 to one input of sampler 40. Apparatus 48 is employed to adjust the D.-C. level and the extent of the $E_Y(t)$ signal such that Y extremals associated with upper extensions, lower extensions or with extensions of intermediate value fall respectively in the upper, lower or center level of the quantizer irrespective of the size and location of the writing on the surface of the telewriter. In order to accomplish this, the normalizing-amplifier 49 adjusts the maximum and minimum values of the A.-C. component of the Y signal to preassigned voltage values. The compensating circuit 50 examines the normalized signal to determine if the maximum and minimum values are attributable to extremals located in upper and lower extensions. If they are not, it supplies a suitable correction voltage and an attenuation to modify the Y signal before it is delivered to sampler 40.

The normalized signal supplied to sampler 40 is sampled on the occurrence of a Y extremal by means of a pulse from OR gate 39. The sampled amplitude is supplied to three-level quantizer 51 wherein the Y value is restricted to one of three individual amplitude ranges and specified, in binary form, at the output terminals C and D. Preferably, the presence of a pulse is indicated by one and the absence of a pulse by a zero. The two binary output channels C and D thus describe one of four conditions:

(1) (C=0, D=0) no Y extremal;
(2) (C=0, D=1) lower extension;
(3) (C=1, D=0) Y extremal of intermediate extent;
(4) (C=1, D=1) upper extension.

Figure 5:
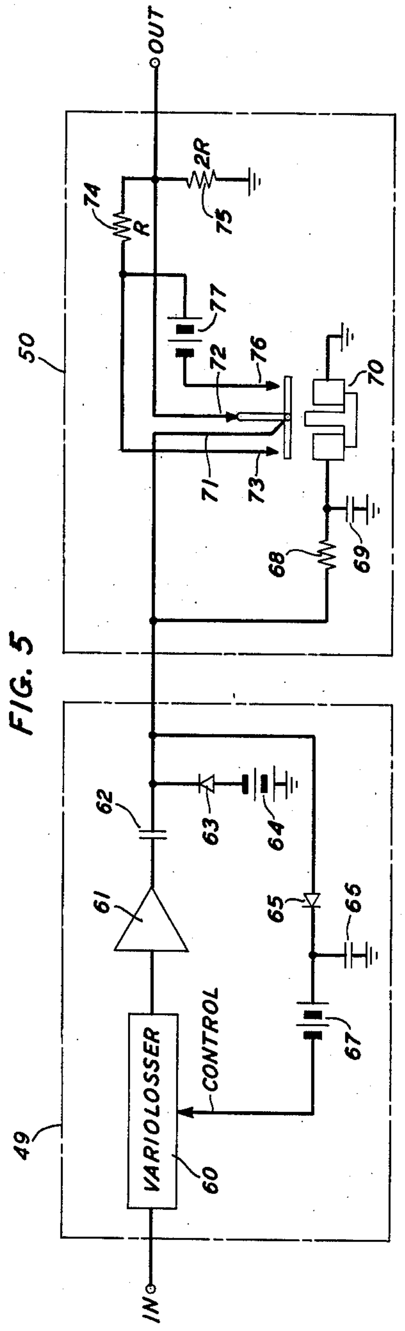
FIG. 5 is a schematic circuit diagram illustrating the details of the normalizer and compensator of FIG. 3.

A detailed circuit schematic diagram of the normalizing-amplifier 48 is shown in FIG. 5. $E_Y(t)$ signals from telewriter 20 are supplied to a variable gain device, e.g., a variolosser circuit 60 of any desired construction, and thence to an amplifier 61 connected serially between the variolosser 60 and a D.-C. restorer circuit including capacitor 62, diode 63 and a source of reference potential, e.g., battery 64. By means of this circuit, the level of the applied signal is established at a fixed, arbitrary level as compared with a fixed reference each time an extremal signal is detected, and this is done regardless of the exact position of the writing or the extremal on the writing surface. Thus, the A.-C. voltage component of the Y signal is amplified and the negative peaks are clamped by the action of the capacitor 62 and diode 63 to the potential of battery 64. A level is established in the normalizing-amplifier that sets the negative peaks of the applied signals so that they invariably fall in the lower quantizer group, e.g., in group $G_1$. An analysis of the operating details of a normalizing circuit of this type is found in Wave Forms, by Britton Chance et al., McGraw-Hill, 1949, at page 55.

In order to adjust the over-all size of the Y signal, once its position with regard to a pre-established reference is fixed, a feedback control signal is generated and applied to the variolosser 60 to adjust the gain of the circuit. In a feedback circuit, the normalized output signal is peak detected and compared to a reference voltage. If the peak output is larger than the reference, the feedback signal reduces the circuit gain. If the peak output signal is smaller than the reference its gain is increased. The peak detection action is achieved by means of diode 65 and a capacitor 66, and the reference potential is supplied, for example, by battery 67. If the amplifier 61 gain is very large the action of the feedback circuit is to maintain the peak-to-peak value of the output signal virtually constant.

It is of course possible that a word will be supplied that does not contain both an upper and lower extension. In this case the normalizing-amplifier adjusts the peak-to-peak value to a level identical to that employed when extensions are present. For example, if there are no upper extensions, the gain of the normalizing-amplifier is too large by the factor $3/2$ since the feedback action causes upper extremes of intermediate extent to have the same magnitude that they would have if they represented extremes from upper extensions. Similarly, if there are no lower extensions, the normalizing-amplifier output is too large by a factor $3/2$.

Accordingly, the compensating circuit 50 detects the absence of an upper or lower extension by determining the average value of the Y signal supplied from the normalizing-amplifier 49 for an entire word, and comparing it with a reference potential, e.g., ground. The time constant of the averaging circuit is adjusted so it is comparable to the time required to write a word. The average value of the Y signal is produced in an integrator circuit including a resistor 68 and capacitor 69 and employed to energize a polarized three-position relay 70. The movable contact 71 of relay 70 is supplied with normalized Y value signals and, in the normal or rest state of relay 70, the Y value signals are passed directly to terminal 72 (and sampler 40) without attenuation. If there are no upper extensions in the word, the average value of the Y signals for the word, as determined by resistor 68 and capacitor 69, is sufficiently above ground to energize relay 70 and move contact 71 to terminal 73. For this condition the normalized signal is attenuated by a factor of two-thirds through the action of the voltage divider comprising resistors 74 and 75 proportioned in the ratio of R to 2R, respectively. Similarly, if no lower extensions are present in the written word, the average value of the Y signals supplied to relay 70 is sufficiently below ground to activate relay 70 in the opposite position such that contact 71 is moved to terminal 76. The normalized signal is thus applied to the attenuation network 74—75 and reduced in value by a factor of $2/3$. For words written without lower extensions, a preselected offset voltage is added to the signal, for example, by means of battery 77, to shift the value of the normalized signal up by a value approximately equal to one level spread of the quantizer, i.e., the signal is shifted up by the normal magnitude of lower extensions. In this fashion the normalizing-amplifier and compensating circuit adjust the Y signal so that it may be used to excite the sampler 40 and quantizer 51 of FIG. 3 with the proper voltages to classify a Y extremal as an upper extension, a lower extension, or an extreme of intermediate extent.

Returning again to a consideration of the encoder apparatus shown in FIG. 3, each extremal found in a word is examined for the properties outlined above and a 5-bit number is supplied at terminals A, B, C, D, and E for each detected extremal. Additionally, an extremal marker pulse is available at terminal M. If an X extremal is present the binary representation actually need use only three bits since the Y amplitude information is not required. To provide some redundancy in the specifications of extremals, however, it may be desirable to provide $E_Y(t)$ amplitude information in the absence of Y extremals. To accommodate this requirement, sampler 40 may be energized on the occurrence of each detected extremal, either an X extremal or a Y extremal, rather than on the occurrence of a Y extremal only. This condition obtains when switch 52 is closed to supply a pulse from OR gate 37 to sampler 40, for each detected extremal regardless of coordinate designation. The momentary value of $E_Y(t)$ will thus be quantized and coded via bits C and D. Preferably, however, a 0, 0 signal is supplied at the C—D terminals for Y extremals so that a 5-bit number is used for all extremal listings. Once the code representation of the extremal has been formed, the X and Y coordinate information need no longer be preserved.

Figures 6A, 6B:
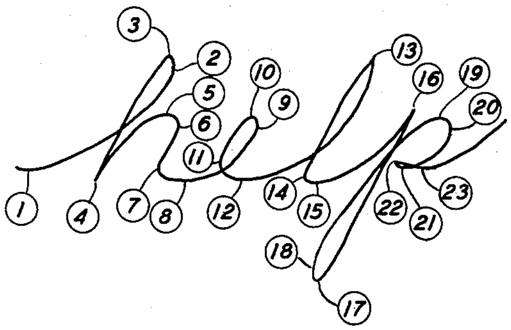
FIG. 6A is a drawing showing a representative script word.
FIG. 6B is a truth table illustrating the manner by which the individual extremals in the word of FIG. 6A are registered.

FIG. 6 illustrates the manner by which the typical Roman script word help is represented by means of a 5-bit binary listing for each of the twenty-three extremals found in the word. The listing is according to the binary code representations discussed above with reference to FIG. 3. Thus bits A and B specify the class of extremal, bits C and D denote the Y extremal amplitude and bit E specifies the sign of the slope of a line joining successive extremals. For completeness, it is assumed that switch 52 (FIG. 3) is closed so that the value of $E_Y(t)$ is quantized and specified completely by code bits C and D in the absence of Y extremals. With switch 52 open, i.e., with sampler 40 actuated only by pulses from OR gate 39, the specification of bits C and D for each X extremal that does not coincide with a Y extremal would be 0, 0. In the word sample of FIG. 6 extremal 17 belongs to amplitude group $G_1$, i.e., a lower extension, while extremals 3 and 13 are classified in group $G_3$, i.e., upper extensions. All other Y extremals in the sample word are members of group $G_2$. Listings of the 5-bit numbers, each characteristic of one extremal, ordered as produced in the handwriting process comprise a complete representation of the word.

Binary representations of successive extremals are stored in a register or the like for subsequent comparison with like indicia representative of dictionary words. Storage apparatus suitable for use in the practice of the invention is shown by way of example in FIG. 7. A shift register of any desired construction is suitable. It must be of sufficient extent to accommodate an arbitrarily large number of binary extremal representations. For convenience, an additional bit of information is utilized to segregate successive 5-bit binary numbers within the register. Accordingly, a one signal is inserted before the initial bit of each number. The resulting 6-bit numbers are registered in shift register 1022 and progressively advanced through the register so that ultimately a succession of 6-bit numbers is permanently registered. It has been found that storage facilities for one hundred extremals is generally sufficient. For this case, a shift register is provided with six hundred (6-bits×100 extremals) individual binary cells.

The extremal identification pulses from terminals A, B, C, D, and E of FIG. 3 are passed by way of gates 81, 82, 83, 84, and 85 and delay elements 86, 87, 88, 89, and 90 into individual cells of shift register 1022 whenever an extremal marker pulse from terminal M in FIG. 3 is applied to the enabling inputs of the AND gates 81 through 85. A one marker signal derived, for example, from generator 91 is likewise passed through an AND gate 92 and delay element 93 into a sixth cell of the register to accompany each extremal representation. Hence, a 6-bit representation is stored in register 1022 for each detected extremal. Each extremal marker pulse supplied from terminal M energizes pulser 94 which emits six pulses that are used to shift the stored information in the first six cells of register 1022 to a new position commencing with the seventh cell. Gates 92 and 81 through 85 are again energized and, after a suitable delay interval provided by delay lines 93 and 86 through 90, the 6-bit extremal representation is entered into the first six cells of the register. The delay intervals, which may be on the order of one millisecond or the like, are provided to insure that the previously registered extremal representation has been shifted into its new position before a new extremal entry is made in the register.

In similar fashion as successive extremals are entered into the register, all previously recorded entries are shifted through the register. At the conclusion of the writing of a word, therefore, the register 1022 contains, in sequential order, 6-bit listings of each extremal encountered during the writing process.

When the writing instrument is removed from the telewriter surface a potential $E_Z(t)$ is generated that is utilized to energize pulser 95. Pulser 95, which may be any form of clock pulse generator or the like, emits pulses that are applied to pulser 94. For each pulse applied to pulser 94 six pulses are emitted that are sufficient to step the signals recorded in shift register 1022 six additional steps through the register. In effect, the extremal listings are transferred to the end position of the shift register. The output pulses generated in pulser 94 are counted continuously in a counter 96. Counter 96 generates an output pulse for each six hundred applied input pulses. When the first binary entry arrives at the end of the register a pulse is emitted by counter 96, stopping pulser 95. The pulse rates of pulsers 94 and 95 may be arbitrarily selected in accordance with the engineering details of the shift register. However, the frequency of pulser 95 as compared with pulser 94 must be such that the interval between successive pulses generated in pulser 95 is greater than the interval between six consecutive pulses generated by pulser 94.

Figure 7:
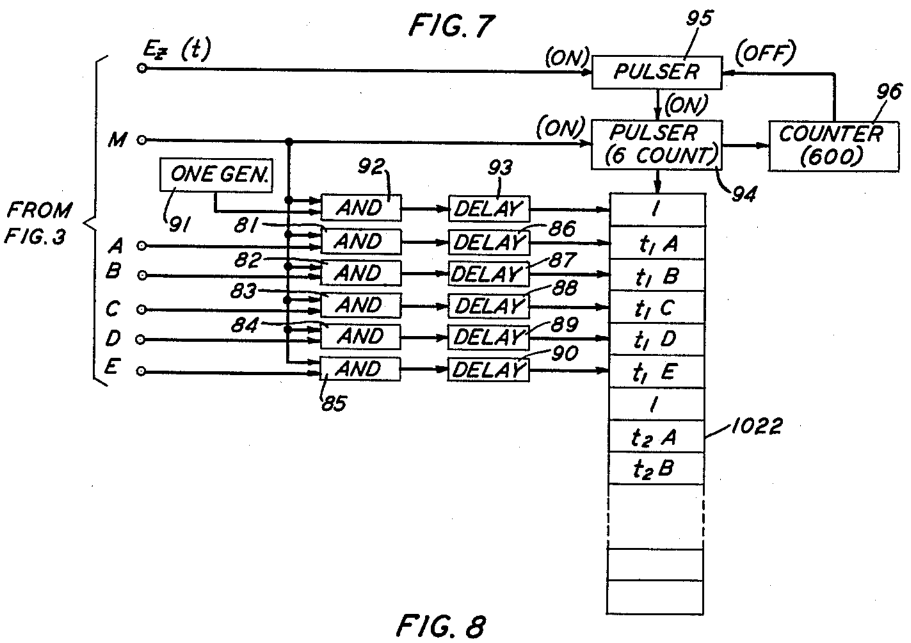
FIG. 7 is a schematic circuit diagram of a shift register suitable for use as the feature storage apparatus in the apparatus of FIG. 2.
Figure 8:
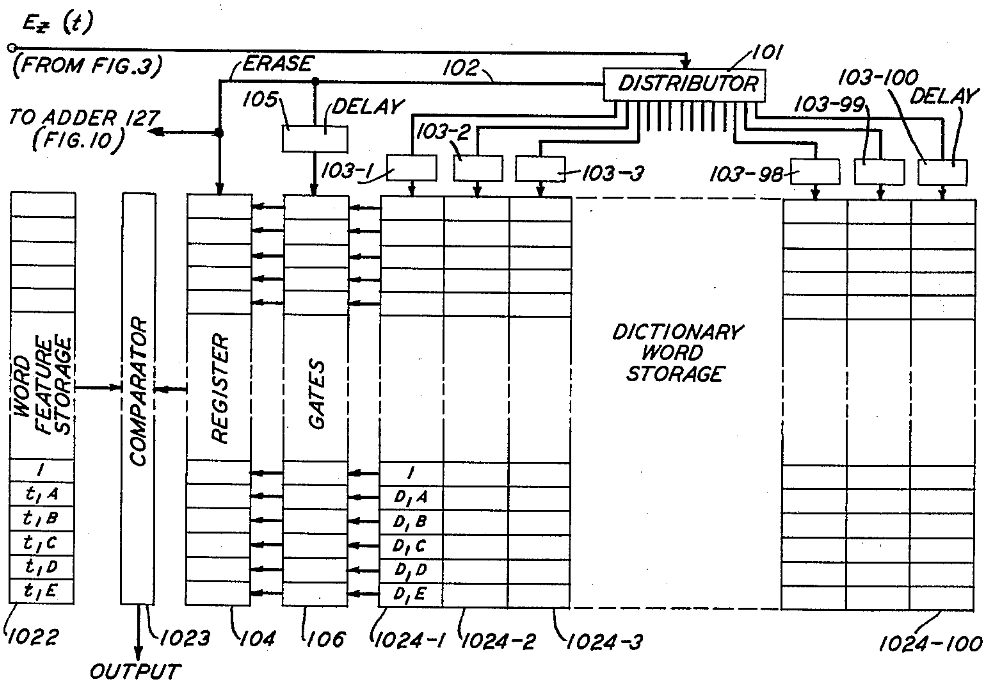
FIG. 8 is a functional block diagram of the dictionary storage and comparator apparatus of FIG. 2.

FIG. 8 shows apparatus suitable for comparing the ordered extremal listing of the word registered in shift register 1022 of FIG. 7 with each of a plurality of extremal listings of selected dictionary words. The extremal listings of each dictionary word are registered, in a fashion similar to that employed for registering the extremal listings from the telewriter, in a dictionary store comprising one hundred individual shift registers 1024–1, 1024–2, 1024–3 . . . . For example, one hundred prestored words may be included in the dictionary store so that one hundred individual shift registers are employed each with six hundred individual cells. Extremal listings of the dictionary words derived, for example, from other handwriting samples of these words are permanently stored in the individual cells of the dictionary store.

Upon the completion of writing, the signal $E_Z(t)$ from the telewriter 20 is supplied to a distributor 101 that supplies pulses sequentially on each of a plurality of output terminals. For the dictionary word storage apparatus 1024, one hundred output terminals are required, each connected to one shift register only. In addition, a pulse is provided on bus 102 for each pulse generated by any one of the individual distributor output leads. If desired, an additional output pulse (developed at the one hundred and first distributor output terminal) may be employed to initiate transfer of the comparator output signal to an output circuit. Delay elements 103–1, 103–2, 103–3, . . . 103–100, of an arbitrarily small value, e.g., one millisecond, are inserted between the distributor output terminals and each one of the dictionary storage shift registers. This delay insures that temporary register 104 is properly erased (by the pulse from distributor on bus 102) before a new word extremal listing is supplied to it.

When triggered by an end of writing signal, distributor 101 begins sequentially to energize the shift registers in the word dictionary store and to transfer from each one in turn all of the stored extremal listings for the word represented thereby to temporary storage in shift register 104 by way of a plurality of AND gates 106. All of the corresponding cells of all shift registers 1024 are connected via one AND gate to one corresponding storage cell (e.g., a binary element) in the temporary register 104. A "read" bus may be used for interconnecting the register cells, if desired.

Consider, for example, one of the shift registers 1024–$n$ in the dictionary store that registers, by means of an ordered extremal listing, one word in the dictionary. As the distributor advances each register is energized in turn and eventually the energizing pulse appears on bus 102 and also at the delay line 103–$n$ associated with register 1024–$n$. The distributor pulse erases the $(n-1)$th word listing from temporary register 104, and after a small delay (105 and 103–$n$), enables AND gates 106 and also initiates parallel readout of all of the individual cells of register 1024–$n$. Each binary digit in the entire register 1024–$n$ is passed through one of the AND gates 106 into a corresponding cell in temporary storage register 104.

Before the distributor emits another pulse to erase the listing stored in register 104 and enter therein the listing from register 1024–$(n+1)$, the $n$th word listing is passed to comparator 1023 where it is compared with the extremal listing of the unidentified word, stored in register 1022.

The identification process carried on in comparator 1023 consists of a correlational comparison of the extreme listing of the word written on the telewriter, referred to as a test word for convenience, with the extreme listing of each dictionary word. Dictionary word and test word lists are, in effect, placed side by side, and entries, i.e., 6-bit characterizations of an extremal, in the two lists that occupy the same position are compared. If the two entries are identical, a correlation value of one is assigned; if different, the correlation is zero. The sum of these values for all entry locations gives the correlation at zero displacement.

Preferably one list is systematically displaced relative to the other by one entry position at a time over a preselected range $p$ and the same matching procedure is carried out. The sum of the correlation values at displacements 1, $\pm 1, \ldots, \pm p$ yields a number which measures the similarity between the test word list and a particular dictionary word list. The dictionary words for which this sum is largest may be selected to provide either multiple or unique identification.

Correlation values obtained by displacing the two lists are utilized in reaching a decision inasmuch as different samples of the same handwritten word may contain different numbers of extremals. In such a case the lists for the test word and the correct dictionary identification of it would tend to get out of step when an extremal in one list failed to appear in the other; and no correlation values would be produced from that point on. Summing correlation at successive displacements effectively avoids this contingency since coherent parts of the word are picked up on successive displacements in spite of the presence of extra extremals. The maximum displacement $p$ should be smaller than the number of extremals in a single letter. If this restriction is not observed, identical letters in different positions of test word and dictionary words will be brought into alignment, resulting in unwanted correlation. Since some letters have as few as four extremals, $p=3$ is an upper limit.

Individual characterization may be introduced by using a dictionary of extremal listings derived from handwritten sample words written by the operator whose later writing is to be automatically read and analyzed. The extremal list representation of a given word, written twice by a single individual, provides greater constancy, both with respect to the number of extremals and to the characteristic of a given extremal than do samples from two different writers.

Figure 9:
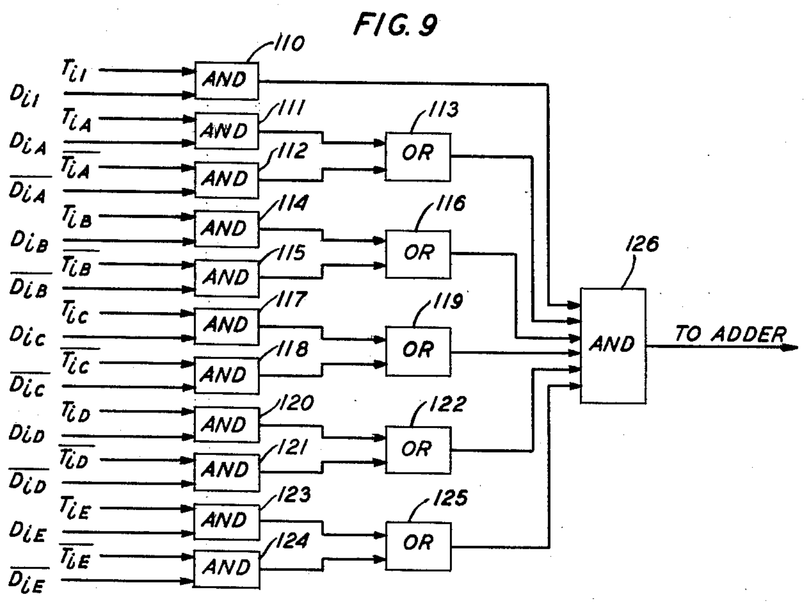
FIG. 9 is a schematic block diagram showing the details of a portion of the apparatus of FIG. 8.

FIG. 9 shows, by way of example, a block schematic diagram of elements employed in implementing the comparator apparatus of FIG. 8. By means of the arrangement shown, an entry characterizing one extremal of a test word written on telewriter 20 is matched with an entry characterizing one extremal of a dictionary word. Elements required for matching one 6-bit representation of an extremal only with its dictionary counterparts are shown. Each bit of the 6-bit entry of the $i$th extremal is applied, respectively, to one input of an AND gate that is supplied at its other input with the corresponding bit from $i$th entry of the dictionary store. It is convenient to supply to a second AND gate the complement of each entry bit, i.e., to supply a zero signal if the actual signal is a one or a one signal if the actual signal is zero. Thus each signal and its complement are supplied with their dictionary counterparts, respectively, to the input terminals of a plurality of AND gates in a fashion such that, if both test and dictionary signals are concurrently one, an output signal is produced or if both signals are zero, an output signal is produced.

Inasmuch as the first bit is always a one, to denote the position of an extremal in the register, only the one signal from register 1022 (denoted $T_{i1}$) and the one signal from the dictionary store 1024 ($D_{i1}$) need be used; these signals are applied to AND gate 110. As a consequence AND gate 110 supplies a pulse to one enabling input of multiple AND gate 126 for each extremal listing registered in both stores. Similarly, bit A from register 1022 ($T_{iA}$) is supplied to an enabling input of AND gate 111, and its complement ($\overline{T_{iA}}$) to an input of AND gate 112. The signals representing bit A ($D_{iA}$) and its complement ($\overline{D_{iA}}$) from the dictionary store, are supplied to the other input terminals of AND gates 111 and 112. If, therefore, a match occurs in either ones or zeros, a pulse is supplied, respectively, by AND gate 111 or AND gate 112 to activate OR gate 113 that in turn supplies an enabling pulse to AND gate 126. The bit B and its complement are supplied to AND gates 114 and 115 with the dictionary store counterparts and a match between either ones or zeros energizes OR gate 116 to supply a pulse to AND gate 126. In like fashion bits C, D, and E are supplied in complementary pairs to AND gates 117, 118; 120, 121; and 123, 124. A match of either ones or zeros for these bits enables OR gates 119, 122, and 125, respectively, that in turn supplies an enabling pulse to AND gate 126. Consequently, a match of all six bits from the $i$th entry of shift register 1022 and from the $i$th entry of the dictionary store 1024 enables AND gate 126 to supply an output pulse.

Figure 10:
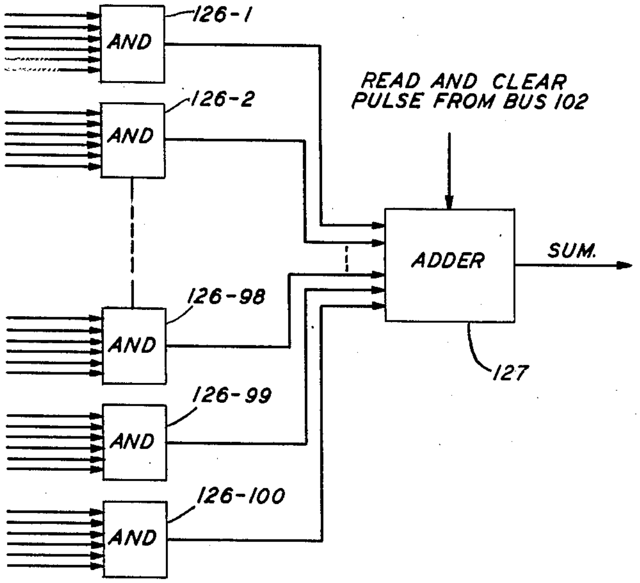
FIG. 10 is a schematic block diagram showing the details of a portion of the comparator apparatus of FIG. 8.

FIG. 10 shows in block schematic form AND gate 126 and similar AND gates associated with other groups of six cells in the register each storing a 6-bit representation of one extremal in a word. AND gates 126–1 through 126–100 supply, for appropriately matching extremal listings, enabling pulses that are accumulated in adder 127. Each of the AND gates 126 supplies a pulse to the adder, if and only if, all six of its inputs carry pulses, i.e., if and only if, all six bits of the extremal in the test word and the six bits of the corresponding dictionary extremal are identical.

In addition the apparatus of FIG. 10 is arranged to compare entries from shift register 1022 and dictionary entries for displacements of $+1$, and $-1$ entries; i.e., in the same fashion as described above, the $i$th entry of the test word is compared to the $(i-1)$th and $(i+1)$th entries of the dictionary word. An additional pair of AND gates is thus required for interconnecting the appropriate extremal signals from shift register 1022 and from the dictionary store to the adder 127. Additional AND gates may be provided to permit displacements of $+2$, $-2$, etc.

In this fashion a sum is derived from adder 127 that is a measure of the similarity between each dictionary word and the test word. Such a sum is found for every dictionary word supplied sequentially to a decision circuit. It identifies the test word for which the summation supplied by adder 127 is the largest, as being identical to the corresponding dictionary word.

Figure 11:
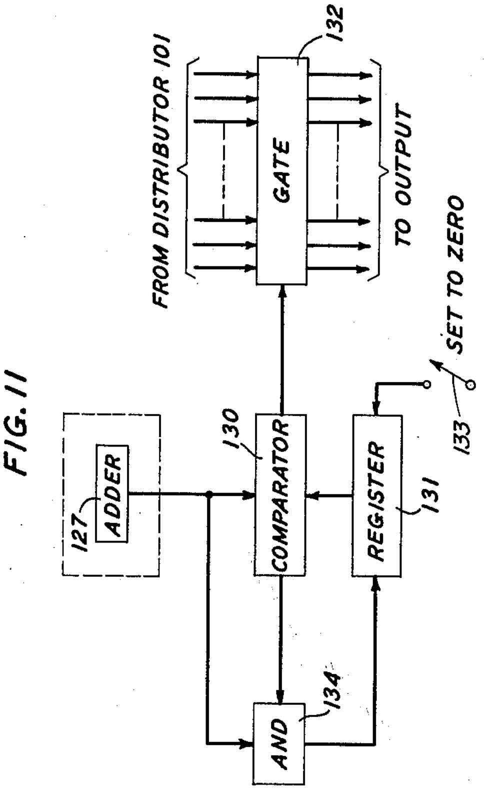
FIG. 11 is a block schematic diagram of the control and decision apparatus employed in the apparatus of FIG. 2.

Apparatus for examining the summation signals from adder 127 to detect the highest summation, denoting a maximum correlation between the unidentified word and the dictionary word, is shown in FIG. 11. Analog signals from adder 127 are supplied to comparator 130. In addition, an analog signal from storage register 131 is supplied to the comparator. An output signal is produced by comparator 130 only if a summation signal from adder 127 exceeds in magnitude the analog signal supplied by storage element 131. Initially storage register 131 is set to zero by any convenient means, for example, by closing a switch 133 at the time that writing on telewriter 20 commences. Accordingly, since the first summation signal from adder 127 generally exceeds in magnitude the zero signal stored in device 131, a pulse is produced by comparator 130 and employed to enable gates 132. The enabling pulse, in addition, energizes AND gate 134 so that the summation signal supplied to comparator 130 is also passed by way of AND gate 134 to register 131 where it is stored as a replacement for the previously stored zero signal. The next received summation signal from adder 127 is thus compared with the last previous summation value signal and, if it exceeds it, gates 132 and 134 are energized placing a new value in register 131.

AND gates 132 have as their second enabling input respectively a signal from distributor 101. Only one of the AND gates 132 thus is potentially enabled by distributor 101 at any one time, and the gate is energized only if the summation signal from adder 127 is the highest summation value recorded until that instant. For this condition gate 132 supplies an output pulse of a lead corresponding to the distributor leads. The last output (highest number) lead energized in the sequence identifies the dictionary word having the largest sum and hence the test word written on telewriter 20. If desired, of course, each AND gate 132 that is subsequently energized may be employed to remove the signal from all previously energized AND gates to leave only one energized output lead as a manifestation of word identity.

Various modifications and extensions of the illustrative embodiments discussed above will suggest themselves to the reader.

What is claimed is:

1. In apparatus for reading and classifying entire words handwritten in cursive script, means for generating coordinate signals proportional at each instant to the coordinates of position of a writing instrument as it is moved to write a word, means responsive to said generated coordinate signals for detecting signal extremals in each of two coordinate directions, means for encoding the coordinates of position and instants of occurrence of all of said detected extremals, means for developing a signal representative of the signs of the differences between successive extremals, means for encoding said representative signals, means for storing said encoded extremal signals and said encoded representative signals to produce an ordered listing of word characteristics, means for preregistering an ordered listing of typical encoded extremals and encoded representative signals of each of a plurality of words, and means operably responsive to said preregistered listings for classifying said written word.

2. Apparatus for identifying entired words handwritten in connected cursive script comprising means for generating two coordinate signals each proportional instantaneously to one coordinate position of a telewriter instrument as it is moved over a surface to write a word, means for detecting local amplitude extremes in each of said signals, means for normalizing the amplitude extremes in at least one of said signals to a pre-established magnitude and to an absolute value as compared with a reference value, means for quantizing the magnitude of said normalized extremes, means for representing each detected extreme in binary form either as a local signal maximum or local signal minimum in one of two coordinate directions, means for obtaining a manifestation of the character of the intervals between successive signal maxima or minima, means for representing said manifestations in binary form either as a generally increasing function or as a generally decreasing function, means for registering said signal extreme representations and said interval representations to produce an ordered listing of word characteristics, means for preregistering an ordered listing of word characteristics of each of a plurality of selected dictionary words, means for obtaining a measure of the correlation between said listings, and means operably responsive to the highest correlation value for identifying said word.

3. Apparatus as defined in claim 2 wherein said means for normalizing said amplitude extremes in said one coordinate direction comprises means for clamping said local maxima of said signals in said one coordinate direction to a first preselected potential level and said local minima to a second preselected potential level, means for attenuating the peak-to-peak magnitude of said one coordinate signal in the absence of detected amplitude minima, means for clamping said signals in said one coordinate direction to a preestablished reference level, and means for attenuating the peak-to-peak magnitude of said one coordinate signal in the absence of detected amplitude maxima.

4. Apparatus for analyzing entire words handwritten in cursive script comprising in combination, telewriter apparatus for generating three output signals, the magnitudes of two of said signals being functions of the coordinate positions X and Y of a writing instrument used to produce cursive script on the telewriter surface, and the magnitude of the third one of said signals indicating contact of said writing instrument with said surface, means for detecting local signal maxima and minima in said X and said Y coordinate directions, means for encoding said detected maxima and minima in binary code form, means for developing a signal representative of the signs of the differences between successive maximum and minimum signals in each of said coordinate directions, means for encoding said representative signals in binary code form, means for storing said encoded maxima and minima signals and said encoded representative signals according to the time sequences in which they are detected, and means energized by said writing instrument contact signal for analyzing said stored sequences of coded signals to produce a signal indicative of the identity of a word written on said telewriter surface.

5. Apparatus as defined in claim 4 wherein said means for detecting local signal maxima and minima comprises means for individually differentiating said X and said Y coordinate signals, and means for developing a marker pulse each time one of said derivatives is equal to zero.

6. In combination the apparatus defined in claim 4, means for normalizing the magnitude of Y function signals to a pre-established reference level, said means comprising means supplied with said Y function signals for adjusting the magnitude range of said signals between the maximum Y function magnitude and the minimum Y function magnitude to a pre-established peak-to-peak voltage, means for clamping said minimum voltage to a preselected voltage, means for quantizing said peak-to-peak voltage into three substantially equal voltage ranges, means for detecting the average value of said adjusted voltage, means for comparing said average value voltage to a reference voltage, means responsive to average value voltages that substantially exceed said reference voltage for attenuating said peak-to-peak voltage by a factor proportional to one of said quantizer voltage ranges, and means responsive to average value voltages that are substantially less than said reference voltage for both attenuating said peak-to-peak voltage by said factor proportional to said quantizer voltage range and clamping said minimum voltage to a voltage that exceeds said preselected voltage by a factor proportional to one of said quantizer voltage ranges.

7. Apparatus as defined in claim 4 wherein said means for developing a signal representative of the sign of the difference between successive maximum and minimum signals in each of said coordinate directions comprises, means for sampling both X and said Y coordinate position signals in response to either the detected local X or Y signal maxima and minima, means for storing said samples until a subsequent local signal maximum or minimum is detected, means for subtracting said instantaneous coordinate position signals respectively from said stored samples to produce a Y difference signal and an X difference signal, means for obtaining a quotient in which said Y difference signal is the dividend and said X difference signal is the divisor, and means for detecting the sign of said quotient.

8. The method of identifying a word handwritten in connected cursive script that comprises the steps of: examining a pair of electrical coordinate signals, representative of the instantaneous position of a writing instrument used by an operator to write connected cursive words, to detect local signal maxima and minima occurring in each of said signals; normalizing that one of said coordinate signals representative of positions of said instrument in its movement normal to the general direction of writing said cursive script to a selected peak-to-peak magnitude; quantizing said normalized signal to three selected amplitude levels, wherein extremals of intermediate extent that occur in letters such as a, e, g and d occupy the centermost level, wherein upper extensions of letters such as h and d occupy the uppermost level, and wherein lower extensions of letters such as g and y occupy the lowermost level; attenuating said normalized peak-to-peak signal in the absence of letters with upper or lower extensions; clamping said peak-to-peak signal to a first pre-established datum level for words in which extremal letter portions occupy said centermost and uppermost levels only; clamping said peak-to-peak signal to a second pre-established datum level for words in which extremal letter portions occupy said centermost and lowermost levels only; generating signals representative of the sign of the slope of straight lines constructed to connect successive signal maxima or minima; developing code signal representations both of said local signal maxima or minima detected in the movement of said instrument in the general direction of writing and of said normalized and clamped local signal maxima and minima in the time sequence in which they are detected; developing code signal representations of said signals representative of the sign of said slopes of said straight lines in an ordered fashion; and analyzing said several code signals together to identify said handwritten word as one of a selected dictionary of words.

References Cited in the file of this patent

UNITED STATES PATENTS

| | | |
|---|---|---|
| 2,889,535 | Rochester et al. | June 2, 1959 |
| 2,905,927 | Reed | Sept. 22, 1959 |
| 2,907,824 | Peek | Oct. 6, 1959 |
| 2,928,074 | Sutter | Mar. 8, 1960 |
| 3,016,421 | Harmon | Jan. 9, 1962 |
| 3,050,711 | Harmon | Aug. 21, 1962 |

FOREIGN PATENTS

| | | |
|---|---|---|
| 229,622 | Australia | Oct. 23, 1958 |
| 233,210 | Australia | Apr. 5, 1961 |
| 846,722 | Great Britain | Aug. 31, 1960 |